(12) United States Patent
Kesse

(10) Patent No.: US 7,240,658 B2
(45) Date of Patent: Jul. 10, 2007

(54) LIMP HOME OPERATING METHOD FOR INTERNAL COMBUSTION ENGINES

(75) Inventor: Mary L. Kesse, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 40 days.

(21) Appl. No.: 11/159,941

(22) Filed: Jun. 23, 2005

(65) Prior Publication Data

US 2006/0288978 A1   Dec. 28, 2006

(51) Int. Cl.
*F02B 17/00* (2006.01)
*F02B 5/00* (2006.01)
*F02M 61/00* (2006.01)

(52) U.S. Cl. .................. 123/295; 123/305; 123/435

(58) Field of Classification Search ............. 123/27 R, 123/295, 299, 305, 435, 479
See application file for complete search history.

(56) References Cited

U.S. PATENT DOCUMENTS

| | | | |
|---|---|---|---|
| 5,458,292 A | | 10/1995 | Hapeman |
| 5,875,743 A | * | 3/1999 | Dickey ................. 123/25 C |
| 6,230,683 B1 | | 5/2001 | Zur Loye et al. |
| 6,516,774 B2 | | 2/2003 | Zur Loye et al. |
| 6,561,157 B2 | | 5/2003 | Zur Loye et al. |
| 6,659,071 B2 | | 12/2003 | LaPointe et al. |
| 6,684,852 B2 | | 2/2004 | Wright et al. |
| 6,725,838 B2 | * | 4/2004 | Shafer et al. ............... 123/305 |
| 6,769,635 B2 | | 8/2004 | Stewart et al. |
| 2004/0112329 A1 | | 6/2004 | Coleman et al. |

FOREIGN PATENT DOCUMENTS

| | | |
|---|---|---|
| DE | 198 50 107 | 5/2000 |
| DE | 102 33 611 | 2/2004 |
| JP | 2002/242730 | 12/2002 |

* cited by examiner

*Primary Examiner*—T. M. Argenbright
(74) *Attorney, Agent, or Firm*—Liell & McNeil

(57) ABSTRACT

A method of operating an internal combustion engine is provided, which includes the step of operating the engine with a mixed mode fuel injector in at least one of a homogeneous charge mode and a conventional mode. The method also includes the step of selectively operating the engine in the conventional mode upon the occurrence of a predetermined homogeneous charge mode failure. An internal combustion engine is provided, having an electronic controller with software logic for selectively operating the engine in the conventional mode, upon the occurrence of a predetermined homogeneous charge mode failure.

20 Claims, 3 Drawing Sheets

LIMP HOME OPERATING METHOD FOR INTERNAL COMBUSTION ENGINES

TECHNICAL FIELD

The present disclosure relates generally to internal combustion engines and operating methods therefor, and more particularly to a method of operating an internal combustion engine having a mixed mode fuel injector, including selectively operating the engine in a conventional mode upon the occurrence of a predetermined homogeneous charge mode failure.

BACKGROUND

The sophistication of internal combustion engines and engine operating schemes continues to advance, and innovations in design and operation are revealed almost daily. One driving force behind many design changes in recent years has been increasingly stringent emissions requirements. One general approach to improving emissions quality relates to treatment of combustion products downstream from the engine. In other words, exhaust gases produced by the engine are treated via a variety of chemical and/or physical processes in an attempt to remove or reduce undesired constituents. In an alternative approach, engine developers have focused more on manipulating aspects of the combustion process itself to improve emissions quality.

Manipulation of fuel injection quantity, frequency, timing and even the type of injection spray pattern has been shown to facilitate reduction of certain undesirable emissions. Of particular interest to engineers are designs meeting or exceeding the government regulations relating to emission limits on various nitrogen-oxygen compounds, known collectively as "NOx".

It has been discovered that enhancing mixing of air and fuel prior to ignition in an internal combustion engine cylinder can help reduce NOx levels in the engine exhaust. In the compression ignition, or diesel engine arts, one particular approach is known as "homogeneous charge compression ignition" or "HCCI". In a homogeneous charge mode, fuel may be injected into an engine cylinder prior to the point at which the cylinder pressure and/or temperature is sufficient to trigger autoignition. This differs from a more traditional approach, wherein fuel is typically injected at or close to a point in the engine cycle at which autoignition can occur. In other words, in homogeneous charge operation, rather than fuel autoigniting upon injection, the fuel may be injected relatively earlier in the engine cycle, having more time to mix with air as the piston travels upward in the cylinder. As a result, ignition of most or all of the injected charge occurs at approximately the same time, rather than relatively gradually via a coherent flame front traversing the cylinder space.

While homogeneous charge operation has shown much promise in improving emissions quality in many vehicles, operation tends to be relatively sensitive to various operating conditions. Undesired variation in certain operating conditions, such as ignition timing, can compromise successful operation. Where a homogeneous charge engine is employed in an on-highway truck, for example, homogeneous charge failure can strand the truck far from a service station.

Various operating schemes and engine designs have developed over the years to reduce the likelihood of engine failures. In most engine designs capable of homogeneous charge operation, an electronic controller is coupled with several of the engine components, and controls various engine parameters to help reduce operating problems. However, even with the most advanced engine control systems, failures of course still occur.

U.S. patent application Ser. No. 10/372,692 to Shinogle et al., filed Feb. 21, 2003, now U.S. Pat. No. 6,997,159 discloses one operating design directed to providing an alternative operation scheme to allow an engine to operate under lower energy level conditions. While Shinogle appears to work well in its particular environment, there is always room for improvement and advancement of such strategies to other technical areas.

The present disclosure is directed to one or more of the problems or shortcomings set forth above.

SUMMARY OF THE INVENTION

In one aspect, the present disclosure provides a method of operating an internal combustion engine. The method includes the step of operating the engine during a given engine cycle in at least one of a homogeneous charge mode and a conventional mode via a mixed mode fuel injector having at least two available spray patterns. The method further includes the step of selectively operating the engine during at least one subsequent engine cycle in the conventional mode via the mixed mode fuel injector, upon the occurrence of a predetermined homogeneous charge mode failure.

In another aspect, the present disclosure provides an internal combustion engine. The engine includes an engine housing having at least one cylinder, and a mixed mode fuel injector disposed at least partially within the at least one cylinder. An electronic controller is provided and is in control communication with the mixed mode fuel injector, the electronic controller including a computer readable medium having a control algorithm recorded thereon. The control algorithm includes, first means for operating the internal combustion engine a homogeneous charge mode, and a second means for selectively operating the internal combustion engine a conventional mode, upon the occurrence of a predetermined homogeneous charge mode failure.

In still another aspect, the present disclosure provides an article that includes a computer readable medium having a control algorithm recorded thereon. The control algorithm includes, means for operating an internal combustion engine in a homogeneous charge mode during a given engine cycle via a mixed mode fuel injector having at least two available spray patterns, and means for selectively operating the engine a limp-home conventional mode via the mixed mode fuel injector during at least one subsequent engine cycle, upon the occurrence of a predetermined homogeneous charge mode failure.

DETAILED DESCRIPTION

Figure 1:
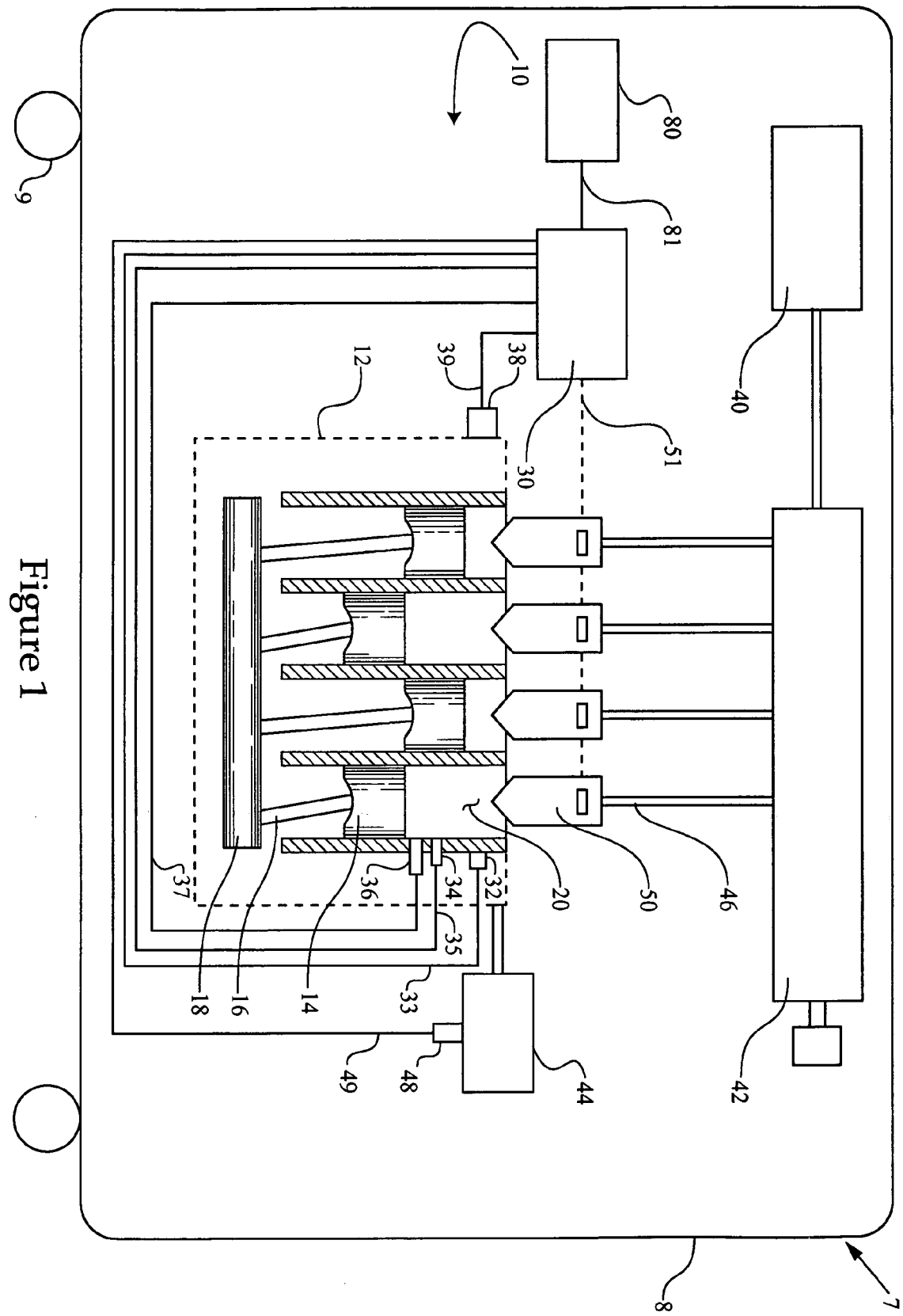
FIG. 1 is a diagrammatic side view of a work machine with an internal combustion engine according to the present disclosure.

Referring to FIG. 1, there is shown an engine 10 according to the present disclosure mounted on chassis 8 of a work machine 7, which has wheels or tracks 9. Engine 10 includes an engine housing 12 and at least one cylinder 20, for example, a plurality of cylinders 20 disposed therein. Engine 10 may further include a piston 14 positioned at least partially within cylinder 20 and reciprocable therein in a conventional manner. A piston rod 16 may connect piston 14 with a crankshaft 18 in a conventional manner. A source of pressurized fuel or a pump 40 may be provided and coupled to at least one mixed mode fuel injector 50, for example a plurality of fuel injectors 50, via a common rail 42 and supply passages 46. While it is contemplated that engine 10 will typically include a plurality of cylinders each having a corresponding fuel injector, cylinder 20 and fuel injector 50 are referred to in the singular herein for ease of description. Engine housing 12 may be coupled with an exhaust system 44, and with a turbocharger (not shown). It is contemplated that engine 10 may be a compression ignition diesel engine, however, it should be appreciated that other engine designs, having a fuel system with one or more unit pump injectors might be used rather than a common rail.

Engine 10 may further include an electronic controller 30 operable to control and/or monitor certain engine operating parameters. Electronic controller 30 may be in communication via a communication line 37 with a pressure sensor 36 exposed to a fluid pressure of cylinder 20, for example disposed at least partially therein. Cylinder pressure sensor 36 may include, for instance, a piezoelectric sensor exposed to cylinder 20. Piezoelectric sensors may include one or more piezoelectric diaphragms, generating a particular voltage or change in voltage upon experiencing a certain degree of deflection or rate of change in deflection due to cylinder pressures. Engine 10 may include a plurality of pressure sensors, disposed one with each of cylinders 20, however, a single pressure sensor may also be used. An engine temperature sensor 34 may also be positioned at least partially within cylinder 20 and connected with electronic controller 30 via another communication line 35. An exhaust sensor such as a NOx sensor 48 may be coupled with exhaust system 44 and in communication with electronic controller 30 via yet another communication line 49. An accelerometer 32, or detonation sensor, may also be provided, positioned for example adjacent housing 12. Accelerometer 32 may be in communication with electronic controller 30 via yet another communication line 33 to allow electronic controller 30 to determine a time or an approximate time of ignition of a fuel charge in cylinder 20. An engine speed sensor 38 may also be coupled with engine 10 and in communication with electronic controller 30 via another communication line 39.

Figure 2:
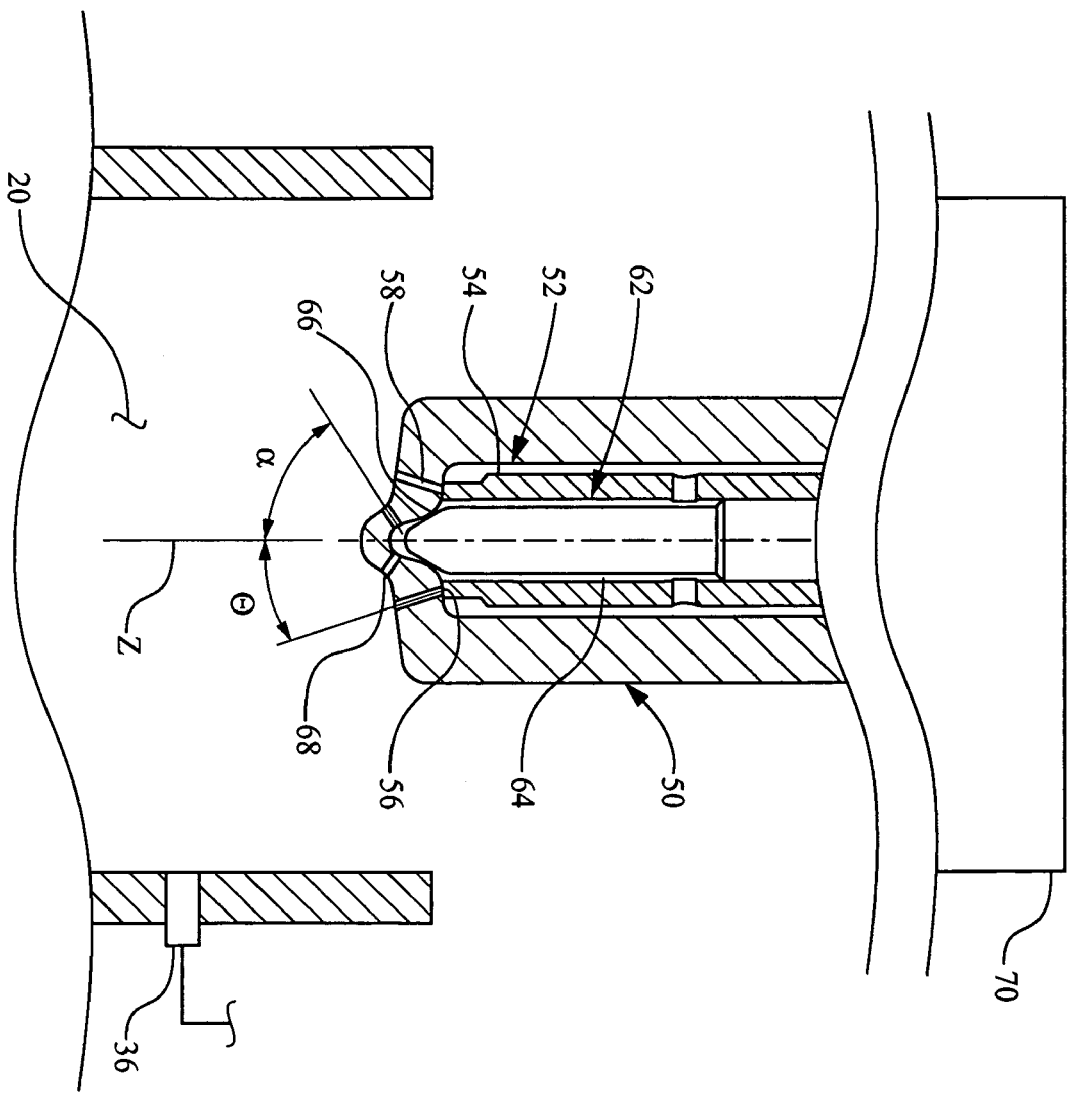
FIG. 2 is a partially sectioned side view of a portion of the internal combustion engine of FIG. 1.

Referring also to FIG. 2, electronic controller 30 may also be in control communication with fuel injector 50 via yet another communication line 51. Fuel injector 50 may be a mixed mode fuel injector disposed at least partially within cylinder 20, and having at least two available spray patterns, as described herein. A variety of suitable mixed mode fuel injectors are known in the art. One exemplary suitable mixed mode fuel injector is known from U.S. Pat. No. 6,725,838 to Shafer et al. Injector 50 may be a dual concentric check fuel injector, including a first or outer check 52 and a second or inner check 62. In one embodiment, outer check 52 may be thought of as a homogeneous charge, or HCCI check, whereas inner check 62 may be thought of as a conventional check, due to their respective spray patterns, as described herein. It should be appreciated that the terms "inner" and "outer" should not be understood to limit the HCCI check or the conventional check to a particular position. Alternative embodiments are contemplated wherein the outer check is the "conventional check" and the inner check is the HCCI check.

Outer check 52 may include a first valve member 54 operable to open or close a first set of injection orifices 58 by moving from or against a first seat 56, respectively. Inner check 62 in turn may include a second valve member 64 operable to open or close a second set of injection orifices 68 by moving from or against a second seat 66, respectively. A control valve assembly 70 may be coupled with fuel injector 50 and with electronic controller 30 to control the opening and closing of outer check 52 and inner check 62, and thus the timing and duration of fuel injections via each respective check. In one contemplated embodiment, electronic controller 30 will be operable to selectively open either or both of first check 52 and second check 62 to inject fuel through the desired corresponding set(s) of injection orifices. Electronic controller 30 may further be operable to command the respective injection(s) at a selected time during a given engine cycle, as described herein.

First set of injection orifices 58 may include a plurality of injection orifices disposed at a first average spray angle $\alpha$ relative to an axis Z of cylinder 20. Second set of injection orifices 68 may include a plurality of injection orifices different from first set 58 that are disposed at a second average spray angle $\theta$ relative to axis Z that is larger than first average spray angle $\alpha$. Injection orifices 58 may thus define a first spray pattern of fuel injector 50, whereas injection orifices 68 may define a second, different spray pattern of fuel injector 50. Those skilled in the art will appreciate that alternative means for providing different spray patterns might be employed without departing from the scope of the present disclosure. For instance, rather than separate sets of injection orifices having different average spray angles, sets of orifices having different sizes or different numbers might be utilized to provide more than one available spray pattern of fuel injector 50.

The present disclosure further provides a method of operating an internal combustion engine. The method may include the step of operating engine 10 during a given engine cycle in at least one of a homogeneous charge mode and a conventional mode via mixed mode fuel injector 50. In the at least one of a homogeneous charge mode and a conventional mode, fuel may be injected into cylinder 20 via first set of injection orifices 58 of fuel injector 50 during the given engine cycle, via second set of injection orifices 68, or both. In other words, during a given engine cycle or plurality of engine cycles, fuel may be injected via any of the available spray patterns of fuel injector 50. It is contemplated that operation in the "at least one of the homogeneous charge mode and the conventional mode" will be a normal engine operation, i.e. where no failure has occurred.

The method may further include the step of selectively operating engine 10 during at least one subsequent engine cycle in the conventional mode via mixed mode fuel injector 50, upon the occurrence of a predetermined homogeneous charge mode failure. Such selective operation will correspond to a limp-home mode of operation, for example, allowing an operator to drive work machine 7 to a service station rather than being stranded. Alternatively, the selective operation in the conventional mode may allow engine 10 to continue to operate until a fault or failure clears, such that homogeneous charge mode operation may be resumed. Where selectively operating engine 10 in a conventional mode during the at least one subsequent engine cycle, fuel may be injected solely via second set of injection orifices 68 of fuel injector 50. It will be recalled that second set of orifices 68 allow fuel injection at the relatively larger spray angle $\alpha$, such that injected fuel will be directed relatively more outwardly from a tip of fuel injector 50. As is well known in the art, orienting the fuel spray outwardly tends to be well suited to a conventional mode operation, wherein fuel may be injected at or close to autoignition conditions in cylinder 20, typically when piston 14 is close to a top dead center position.

In one contemplated embodiment, during a typical engine cycle, or plurality of engine cycles, electronic controller 30 may command injection of fuel via the first spray pattern to effect homogeneous charge operation so long as engine 10 is operating in a relatively lower portion of a power range. Where greater power is demanded of engine 10, conventional operation may be employed to supplement the power provided via homogeneous charge operation. Where engine 10 is selectively operated in the conventional mode, the available power range may be relatively lower, merely providing enough power for work machine 7 employing engine 10 to limp home to a service station.

As used herein, the term "predetermined homogeneous charge mode failure" should be understood to encompass any determined engine condition that may allow electronic controller 30 to determine that homogeneous charge mode is not operational, or not operating as desired. To this end, the predetermined homogeneous charge mode failure may be a control signal failure, inclusive of both a particular control signal or the absence of a control signal, between electronic controller 30 and any of accelerometer 32, temperature sensor 34, pressure sensor 36, engine speed sensor 38 or NOx sensor 48. Although not shown, a conventional ion sensor might be used with engine 10 to facilitate determining an ignition timing, and in turn allow electronic controller 30 to determine a homogeneous charge mode failure if ignition timing is off, as described herein. Still further engine conditions that may indicate the failure or undesirability of continued homogeneous charge mode operation are known in the art, and might be used in determining that selective operation in the limp-home mode described herein is appropriate.

The method of the present disclosure may further include determining a value indicative of at least one of a cylinder pressure and a rate of change in cylinder pressure of cylinder 20 of engine 10, for example with pressure sensor 36. As used herein, the term "value indicative of" should be understood to encompass both direct measurements of the characteristic of interest, as well as indirect measurements or estimates based on determination of another value or characteristic having a known relationship to the characteristic of interest. As described herein, it is contemplated that one means for determining a homogeneous charge mode failure may be via a control signal failure between pressure sensor 36 and electronic controller 30. Electronic controller 30 may determine, for instance, that a cylinder pressure or a cylinder pressure increase is too large or too small to make continued attempted HCCI operation desirable. Alternatively, electronic controller 30 may determine that no control signal exists between pressure sensor 36 (or any other sensor) and that, accordingly, continued attempted HCCI operation is undesirable.

Rather than measuring cylinder pressure directly, another means for determining the value indicative of at least one of, cylinder pressure and rate of change in cylinder pressure may include an optical sensor. Certain optical sensors may be employed to determine an amplitude of transmitted light within the cylinder, having a known relationship with cylinder pressure. Such sensors are commercially available from Optrand, Inc. of Plymouth, Mich. Other suitable optical sensors include an interferometer operable to measure differences in frequency created by a semi-permeable cavity that changes shape based on cylinder pressure. Such interferometer sensors are commercially available from Fiber Dynamics, Inc. of High Point, N.C. Yet another suitable sensor type may include a micro-strain gauge cylinder pressure sensor. Such sensors are operable to determine the relatively small movements of a glow plug rod in the cylinder in proportion to changes in cylinder pressure, and are commercially available from Texas Instruments of Dallas, Tex. Ion sensors manufactured by Woodward Governor of Rockford, Ill., which measure the levels of ions in the vicinity of an in-cylinder probe may also be used, as may in-cylinder flame front sensors of the type manufactured by Caterpillar Inc. of Peoria, Ill.

The method of the present disclosure may further include determining an ignition timing of fuel injected while operating the engine in the at least one of a homogeneous charge mode and a conventional mode. Timing of ignition may be determined, for example, at least in part with pressure sensor 36 or with the alternative pressure-determining means discussed above. Alternatively, ignition timing might be determined via accelerometer 32, or an ion sensor as previously described. As described herein, it is contemplated that another means for determining a homogeneous charge mode failure may include determining that an ignition timing is outside a predetermined ignition timing range. For example, where operating in a homogeneous charge mode, it may be desirable for the injected fuel to ignite within a predetermined crank angle range. Where ignition is occurring too late or too early, for instance, homogeneous charge mode operation may be compromised, and initiation of the limp-home mode desirable, as described herein.

Electronic controller 30 may further include a computer readable medium, such as RAM, ROM or any other suitable medium having a control algorithm recorded thereon. The control algorithm may include first means for operating engine 10 soley in a homogeneous charge mode or a mixed mode that includes homogenous and conventional injections in a single engine cycle, and second means for selectively operating engine 10 in a conventional mode, upon the occurrence of the predetermined homogeneous charge mode failure. The first means may include means for commanding injection of fuel into cylinder 20 via at least the first spray pattern of fuel injector 50, whereas the second means may include means for commanding injection of fuel into cylinder 20 via the second spray pattern of fuel injector 50, for instance solely via the second spray pattern. In one contemplated embodiment, the second means may further include means for selectively opening second check 62 without opening first check 52 during a plurality of engine cycles subsequent to a given engine cycle. The second means may serve as an alternative control strategy for engine 10 so that factors such as fuel injection timing and duration may be practicably controlled, even where normal operation is compromised.

The control algorithm of electronic controller 30 may further include means for determining an ignition timing of fuel injected in homogeneous charge mode during a given engine cycle. The second means may further include means for selectively operating engine 10 in the limp-home conventional mode by selectively commanding injection of fuel in a plurality of engine cycles subsequent to the given engine cycle. The described selective operation of engine 10 may be initiated based at least in part on a determined ignition timing during the given engine cycle, for example a determined ignition timing that is outside of a predetermined range, as described herein. The control algorithm may further include means for detecting the occurrence of the predetermined homogeneous charge mode failure at least in part via at least one of, pressure sensor 36, temperature sensor 34, engine speed sensor 38, NOx sensor 48 or accelerometer 32.

INDUSTRIAL APPLICABILITY

During normal operation, engine 10 will be operated in the described at least one of homogeneous charge mode and conventional mode, which includes a mixed mode. Fuel may be injected via the first spray pattern for homogeneous charge operation, and fuel may be injected via the second spray pattern for conventional mode operation, corresponding to operation via the first means of the control algorithm of electronic controller 30. For instance, the engine 10 may operate soley in a homogenous mode, but operate in a mixed mode at higher loads and speeds for reasons known in the art. As described, either or both of homogeneous charge mode operation and conventional mode operation may occur in a given engine cycle during normal operation. Upon the occurrence of the predetermined homogeneous charge mode failure, however, the second means of the control algorithm of electronic controller 30 may be activated. Where the predetermined failure has occurred, in at least one subsequent engine cycle engine 10 will be operated in the conventional mode, for example at a lower power range, allowing engine 10 to continue to operate until servicing is possible. It is contemplated that rather than actually servicing engine 10, electronic controller 30 or some other element of engine 10 may be configured to reset electronic control, such that normal operation may be restored, for example via the first means of the control algorithm described herein. For example, embodiments are contemplated wherein, rather than simply activating the limp-home logic and keeping it active until servicing, where the predetermined failure or fault is cleared, normal operation may be restored, and the limp-home logic deactivated.

Figure 3:
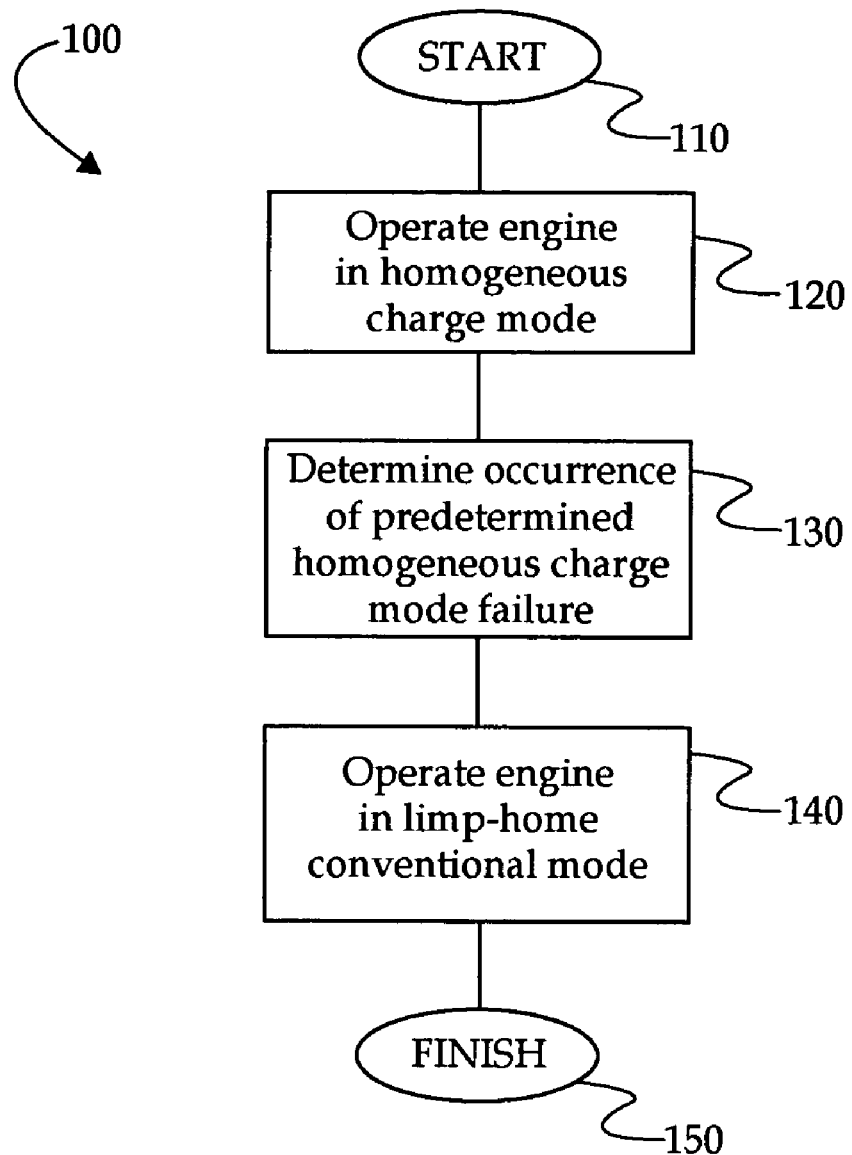
FIG. 3 is a flowchart illustrating a control process according to the present disclosure.

Turning now to FIG. 3, there is shown a flowchart 100 illustrating an exemplary control process according to the present disclosure. The process may begin at a START, Box 110. From Box 110, the process may proceed to Box 120, wherein electronic controller 30 may operate engine 10 in at least one of homogeneous charge mode and conventional mode in a given engine cycle, shown only as homogeneous charge mode in FIG. 3. From Box 120, the process may proceed to Box 130, wherein electronic controller may determine the occurrence of the predetermined homogeneous charge mode failure. As described herein, the predetermined failure may be any of a variety of control signal failures in engine 10. From Box 130, the process may proceed to Box 140, wherein electronic controller 30 may selectively operate engine 10 in the limp-home conventional mode for at least one subsequent engine cycle. The process may thenceforth proceed to a FINISH, Box 150.

The present description is for illustrative purposes only, and should not be construed to narrow the scope of the present disclosure in any fashion. Thus, those skilled in the art will appreciate that various modifications might be made to the presently disclosed embodiments without departing from the intended spirit and scope of the present disclosure. For example, while it is contemplated that the selective conventional mode operation will be effected by injecting fuel via the second spray pattern of injector 50, alternatives are contemplated. Rather than switching to a spray pattern specific to conventional mode operation, the timing and/or duration of fuel injection might be switched to allow engine 10 to limp home. For example, upon the occurrence of the predetermined homogeneous charge mode failure, control could switch such that fuel injection takes place close to a top dead center position of piston 14 rather than relatively earlier in a given engine cycle, as would typically be the case for HCCI operation. Other aspects, features and advantages will be apparent upon an examination of the attached drawing Figures and appended claims.

What is claimed is:

1. A method of operating an internal combustion engine comprising the steps of:
    operating the engine during a given engine cycle in at least one of a homogeneous charge mode and a conventional mode via a mixed mode fuel injector having at least two available spray patterns;
    selectively operating the engine during at least one subsequent engine cycle in the conventional mode via the mixed mode fuel injector, upon the occurrence of a predetermined homogeneous charge mode failure; and
    determining an engine condition indicative of the predetermined homogeneous charge mode failure includes at least one of detecting a control signal failure, a cylinder pressure being too large, a cylinder pressure rise rate being too large and an ignition timing being outside of a predetermined ignition timing range.

2. The method of claim 1 wherein:
    the step of operating the engine in at least one of a homogeneous charge mode and a conventional mode comprises injecting a fuel into the at least one cylinder via a first spray pattern of the mixed mode fuel injector during the given engine cycle; and
    the step of selectively operating the engine in the conventional mode comprises injecting a fuel into the at least one cylinder via a second spray pattern different from the first spray pattern during a plurality of subsequent engine cycles.

3. The method of claim 2 wherein:
    the step of operating the engine in at least one of a homogeneous charge mode and a conventional mode comprises injecting fuel via a first set of injection orifices of the mixed mode fuel injector; and
    the step of selectively operating the engine in a conventional mode comprises injecting fuel via a second set of injection orifices of the mixed mode fuel injector different from the first set.

4. The method of claim 1 further comprising a step of determining a value indicative of at least one of a cylinder pressure and a rate of change in cylinder pressure of the at least one cylinder via a pressure sensor exposed to a fluid pressure of the at least one cylinder.

5. The method of claim 4 further comprising a step of determining an ignition timing of fuel injected while operating the engine in the at least one of a homogeneous charge mode and a conventional mode, at least in part with the pressure sensor.

6. A method of operating an internal combustion engine comprising the steps of:
    operating the engine during a given engine cycle in at least one of a homogeneous charge mode and a conventional mode via a mixed mode fuel injector having at least two available spray patterns;
    selectively operating the engine during at least one subsequent engine cycle in the conventional mode via the mixed mode fuel injector, upon the occurrence of a predetermined homogeneous charge mode failure;
    determining a value indicative of at least one of a cylinder pressure and a rate of change in cylinder pressure of the at least one cylinder via a pressure sensor exposed to a fluid pressure of the at least one cylinder;

determining an ignition timing of fuel injected while operating the engine in the at least one of a homogeneous charge mode and a conventional mode, at least in part with the pressure sensor; and wherein the step of selectively operating the engine in the conventional mode comprises a step of determining the occurrence of the predetermined homogeneous charge mode failure, if the determined ignition timing is outside of a predetermined range.

7. The method of claim 4 wherein:

the step of operating the engine in at least one of a homogeneous charge mode and a conventional mode comprises operating the engine within a first power range; and the step of selectively operating the engine in the conventional mode comprises operating the engine within a second power range lower than the first power range.

8. A method of operating an internal combustion engine comprising the steps of:

operating the engine during a given engine cycle in at least one of a homogeneous charge mode and a conventional mode via a mixed mode fuel injector having at least two available spray patterns;

selectively operating the engine during at least one subsequent engine cycle in the conventional mode via the mixed mode fuel injector, upon the occurrence of a predetermined homogeneous charge mode failure;

determining a value indicative of at least one of a cylinder pressure and a rate of change in cylinder pressure of the at least one cylinder via a pressure sensor exposed to a fluid pressure of the at least one cylinder;

the step of operating the engine in at least one of a homogeneous charge mode and a conventional mode comprises operating the engine within a first power range;

the step of selectively operating the engine in the conventional mode comprises operating the engine within a second power range lower than the first power range; and wherein the step of selectively operating the engine in at least one of a homogeneous charge mode and a conventional mode further comprises a step of determining the occurrence of the predetermined homogeneous charge mode failure via a control signal failure from at least one of, the pressure sensor, a temperature sensor disposed at least partially within said at least one cylinder, an engine speed sensor, a NOx sensor in an exhaust system of the internal combustion engine and an accelerometer disposed adjacent a housing of the internal combustion engine.

9. The method of claim 8 wherein:

the step of operating the engine in at least one of a homogeneous charge mode and a conventional mode includes injecting fuel via the first set of injection orifices, wherein the first set includes a plurality of injection orifices disposed at a first average spray angle relative to an axis of the at least one cylinder; and the step of selectively operating the engine in the conventional mode includes injecting fuel solely via the second set of injection orifices, wherein the second set includes a plurality of injection orifices disposed at a second average spray angle relative to the axis that is larger than the first average spray angle.

10. An internal combustion engine comprising:

an engine housing having at least one cylinder;

a mixed mode fuel injector disposed at least partially within said at least one cylinder; and an electronic controller in control communication with said mixed mode fuel injector, said electronic controller including a computer readable medium having a control algorithm recorded thereon, said control algorithm including, first means for operating the internal combustion engine in a homogeneous charge mode, and second means for selectively operating the internal combustion engine in a conventional mode, upon the occurrence of a predetermined homogeneous charge mode failure;

The electronic controller including means for determining an engine condition indicative of the predetermined homogeneous charge mode failure by detecting a control signal failure, a cylinder pressure being too large, a cylinder pressure rise rate being too large and an ignition timing being outside of a predetermined ignition timing range.

11. The internal combustion engine of claim 10 wherein:

said mixed mode fuel injector includes at least a first spray pattern and a second spray pattern different from the first spray pattern;

said first means includes means for commanding injection of a fuel into said at least one cylinder via at least the first spray pattern; and said second means includes means for commanding injection of a fuel into said at least one cylinder via the second spray pattern.

12. The internal combustion engine of claim 11 wherein said mixed mode fuel injector comprises:

a first set of injection orifices disposed at a first average spray angle relative to an axis of said cylinder and defining the first spray pattern; and a second set of injection orifices disposed at a second average spray angle relative to said axis that is larger than said first average spray angle and defining the second spray pattern.

13. The internal combustion engine of claim 12 wherein:

said control algorithm further includes means for determining an ignition timing of fuel injected in said homogeneous charge mode during a given engine cycle; and said second means includes means for selectively operating said engine in a limp-home conventional mode via selectively commanding injection of fuel in a plurality of subsequent engine cycles, based at least in part on the determined ignition timing in the given engine cycle.

14. The internal combustion engine of claim 12 further comprising:

a pressure sensor exposed to a fluid pressure of the at least one cylinder;

said means for determining includes at least one of, the pressure sensor, a temperature sensor disposed at least partially within said at least one cylinder, an engine speed sensor, a NOx sensor disposed in an exhaust system of said internal combustion engine and an accelerometer disposed adjacent said engine housing.

15. The internal combustion engine of claim 14 wherein:

said first means further comprises means for operating said internal combustion engine in a first power range;

said second means further comprises means for operating said internal combustion engine in a second power range that is lower than said first power range.

16. The internal combustion engine of claim 14 wherein:
said mixed mode fuel injector includes a first check movable to open said first set of injection orifices during said given engine cycle;
said mixed mode fuel injector includes a second check concentric with said first check and movable to open said second set of injection orifices; and
said second means includes means for selectively opening said second check without opening said first check during the plurality of subsequent engine cycles.

17. An article comprising:
a computer readable medium having a control algorithm recorded thereon, said control algorithm including, means for operating an internal combustion engine in a homogeneous charge mode during a given engine cycle via a mixed mode fuel injector having at least two available spray patterns, and means for selectively operating the engine in a limp-home conventional mode via the mixed mode fuel injector during at least one subsequent engine cycle, upon the occurrence of a predetermined homogeneous charge mode failure; and
wherein said control algorithm further comprises, means for determining the occurrence of the failure based on at least one of a cylinder pressure being too large, a cylinder pressure rise rate being too large and an ignition timing being outside of a predetermined ignition timing range.

18. An article comprising:
a computer readable medium having a control algorithm recorded thereon, said control algorithm including, means for operating an internal combustion engine in a homogeneous charge mode during a given engine cycle via a mixed mode fuel injector having at least two available spray patterns, and means for selectively operating the engine in a limp-home conventional mode via the mixed mode fuel injector during at least one subsequent engine cycle, upon the occurrence of a predetermined homogeneous charge mode failure;
wherein said control algorithm further comprises, means for determining the occurrence of the failure based on a control signal failure between an electronic controller of the internal combustion engine and at least one of, a pressure sensor exposed to a fluid pressure of at least one cylinder of the internal combustion engine, a temperature sensor disposed at least partially within said at least one cylinder, an engine speed sensor, a NOx sensor in an exhaust system of the internal combustion engine and an accelerometer disposed adjacent a housing of the internal combustion engine.

19. The article of claim 18 wherein:
said means for operating the engine in said at least one of a homogeneous charge mode and a conventional mode includes means for commanding injection of a fuel into the at least one cylinder via at least a first spray pattern of the mixed mode fuel injector; and
said means for selectively operating the engine in said conventional mode comprises means for selectively commanding injection of a fuel into said at least one cylinder via a second, different spray pattern of the mixed mode fuel injector.

20. The article of claim 19 wherein said means for selectively commanding injection of a fuel via said second spray pattern comprises means for selectively commanding said injection at least in part by moving one of, an outer check and an inner check of said mixed mode fuel injector, without moving the other of, the outer check and the inner check of said mixed mode fuel injector during a plurality of subsequent engine cycles.

* * * * *